United States Patent
Ogawa et al.

(10) Patent No.: US 8,520,362 B2
(45) Date of Patent: Aug. 27, 2013

(54) LAMINATED CERAMIC ELECTRONIC COMPONENT AND MANUFACTURING METHOD THEREFOR

(75) Inventors: Wataru Ogawa, Nagaokakyo (JP); Makoto Ogawa, Nagaokakyo (JP); Masahito Saruban, Nagaokakyo (JP); Toshiyuki Iwanaga, Nagaokakyo (JP); Akihiro Motoki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/359,519

(22) Filed: Jan. 27, 2012

(65) Prior Publication Data

US 2012/0194031 A1    Aug. 2, 2012

(30) Foreign Application Priority Data

Feb. 1, 2011 (JP) .................... 2011-019417

(51) Int. Cl.
*H01G 4/228* (2006.01)
(52) U.S. Cl.
USPC ............ 361/306.3; 361/306.1; 361/303; 361/311; 361/313; 361/321.2
(58) Field of Classification Search
USPC ............ 361/306.3, 303–305, 306.1, 309, 361/311–313, 321.1, 321.2
See application file for complete search history.

(56) References Cited

U.S. PATENT DOCUMENTS

| | | | |
|---|---|---|---|
| 6,898,069 B2 * | 5/2005 | Yamaguchi et al. ......... | 361/303 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |

(Continued)

FOREIGN PATENT DOCUMENTS

| | | |
|---|---|---|
| JP | 63-169014 A | 7/1988 |
| JP | 2006-310700 A | 11/2006 |
| JP | 2010-267687 A | 11/2010 |
| KR | 10-2008-0033473 A | 4/2008 |

OTHER PUBLICATIONS

Kunishi et al., "Laminated Electronic Component and Method for Manufacturing the Same", U.S. Appl. No. 12/030,282, filed Feb. 13, 2008.

(Continued)

*Primary Examiner* — Nguyen T Ha
(74) *Attorney, Agent, or Firm* — Keating & Bennett, LLP

(57) ABSTRACT

In a method of forming an external electrode by growing plated depositions on exposed ends of a plurality of internal electrodes in a component main body, the component main body is polished to increase exposure of the internal electrodes. To prevent decreased external electrode fixing strength, a radius of curvature is reduced to about 0.01 mm or less for an R chamfered section formed in a ridge section of the component main body during polishing by ion milling, and exposed ends of the internal electrodes are recessed from end surfaces of the component main body with a recess length of about 1 µm or less. Plating films to serve as external electrodes are formed to extend from the end surfaces of the component main body across the R chamfered section, and include end edges located on at least one of the principal surfaces and the side surfaces.

6 Claims, 4 Drawing Sheets

(56) References Cited

U.S. PATENT DOCUMENTS

| | | |
|---|---|---|
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,394,643 B2 * | 7/2008 | Yamane et al. ............... 361/303 |
| 7,463,474 B2 | 12/2008 | Ritter et al. |
| 7,859,821 B2 * | 12/2010 | Shimizu ..................... 361/306.3 |
| 8,149,566 B2 * | 4/2012 | Motoki et al. ................ 361/305 |
| 8,254,081 B2 * | 8/2012 | Nishihara et al. ............. 361/300 |
| 8,411,409 B2 * | 4/2013 | Ogawa et al. .............. 361/301.4 |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |

OTHER PUBLICATIONS

Kunishi et al., "Laminated Electronic Component and Method for Manufacturing the Same", U.S. Appl. No. 12/030,360, filed Feb. 13, 2008.

Tani, "Multilayer Electronic Component and Method for Manufacturing the Same", U.S. Appl. No. 12/481,690, filed Jun. 10, 2009.

Ito et al., "Laminated Ceramic Electronic Component", U.S. Appl. No. 12/489,631, filed Jun. 23, 2009.

Sasabayashi, "Multilayer Ceramic Electronic Component", U.S. Appl. No. 12/765,965, filed Apr. 23, 2010.

Sasabayashi et al., "Electronic Component", U.S. Appl. No. 13/092,996, filed Apr. 25, 2010.

Takeuchi et al., "Method for Manufacturing Ceramic Electronic Component and Ceramic Electronic Component", U.S. Appl. No. 13/357,671, filed Jan. 25, 2012.

* cited by examiner

LAMINATED CERAMIC ELECTRONIC COMPONENT AND MANUFACTURING METHOD THEREFOR

BACKGROUND OF THE INVENTION

1. Field of the Invention

The present invention relates to a laminated ceramic electronic component and a method for manufacturing the same, and more particularly, to a laminated ceramic electronic component including an external terminal electrode, which is formed by plating so as to be directly electrically connected at least partially to a plurality of internal electrodes, and a method for manufacturing the same.

2. Description of the Related Art

External electrodes for a laminated ceramic capacitor as an example of laminated ceramic electronic components are typically formed by applying a conductive paste to ends of a component main body and subjecting the conductive paste to firing. However, the external electrodes formed by this method are large in thickness, from several tens of μm to several hundreds of μm.

Therefore, in order to limit the dimensions of the laminated ceramic capacitor up to certain specifications, there has been undesirably a need to reduce the effective volume for ensuring an electrostatic capacitance, because there is a need to ensure the volume for the external electrodes.

Japanese Patent Application Laid-Open No. 63-169014 discloses a conductive metal film deposited by electroless plating on the entire sidewall surface of a component main body, at which internal electrodes are exposed, so as to short circuit the internal electrodes exposed at the sidewall surface, and used as an external electrode. According to the technique disclosed in Japanese Patent Application Laid-Open No. 63-169014, the volume of the external electrode can be reduced, and the effective volume for ensuring an electrostatic capacitance can be thus increased.

In the case of applying plating directly to the exposed ends of the internal electrodes as in the method for forming an external electrode disclosed in Japanese Patent Application Laid-Open No. 63-169014, the exposed ends of the internal electrodes will fail to function adequately as nuclei for plating deposition unless the exposed ends are exposed adequately from the component main body. It is to be noted that the adequate exposure of the exposed ends of the internal electrodes includes not only cases where the exposed ends of the internal electrodes are flush with or project from the outer surface of the component main body, but also cases where the exposed ends are even recessed from the outer surface of the component main body with a relatively short recess length.

However, in usual cases, component main bodies that have just been fired often have exposed ends of internal electrodes that are insufficiently exposed from the component main bodies, and thus, the coverage may be decreased for plating films to serve as external electrodes. In addition, while the adhesion between the external electrode and the component main body is ensured mainly in a joining section between the internal electrodes and the plating film, it is not possible to achieve adequate joining between the internal electrodes and the plating film when the exposed ends of the internal electrodes are not exposed sufficiently. Therefore, the adhesion between the external electrode and the component main body is decreased to cause a gap particularly between outer edges of the plating film and the component main body, thereby easily leading to a decrease in moisture resistance.

Therefore, conventionally, as a pretreatment for a plating step, at least a surface of a component main body at which exposed ends of internal electrodes are present is subjected to polishing, thereby sufficiently exposing the exposed ends of the internal electrodes from the component main body. For the polishing, in general, a sandblasting method or a barrel polishing method is applied, for example. However, a relatively long processing time, which is not less than a certain period of time, has been required, in order to ensure the degree of exposing the internal electrodes by applying a sandblasting method or a barrel polishing method.

On the other hand, in spite of performing the polishing step by a sandblasting method or a barrel polishing method, which should be carried out for the purpose of ensuring the degree of exposure of the internal electrodes as described above, the longer processing time of the polishing step may in return decrease the fixing strength of ends of the plating film so as to decrease the moisture resistance.

Laminated ceramic electronic components other then the laminated ceramic capacitors can also encounter the same problems as described above.

SUMMARY OF THE INVENTION

Preferred embodiments of the present invention provide a laminated ceramic electronic component which can solve the problems described above, and a method for manufacturing the laminated ceramic component.

As a result of earnest studies made by the inventor under the assumption that the polishing develops R chamfering in a ridge section of a component main body, thus increasing the radius of curvature for an R chamfered section in the ridge section of the component main body accordingly as the polishing time becomes longer, which is associated with the problems described above, the inventor has discovered that the fixing strength of ends of a plating film can be prevented from being decreased by carrying out a polishing step so as to control the radius of curvature to a predetermined value or less for a ridge section of a component main body, thereby leading to development of preferred embodiments of the present invention.

A laminated ceramic electronic component according to a preferred embodiment of the present invention includes a component main body having a substantially rectangular parallelepiped shape, the component main body including a pair of principal surfaces opposed to each other, a pair of side surfaces opposed to each other, and a pair of end surfaces opposed to each other, and a plurality of ceramic layers extending in a direction in which the principal surfaces extend and stacked in a direction of connecting the pair of principal surfaces, and a plurality of internal electrodes arranged along a plurality of interfaces between the ceramic layers, the internal electrodes each including an end exposed at either one of the pair of end surfaces; and an external electrode including a plating film disposed directly on the end surfaces so as to be electrically connected to the plurality of internal electrodes.

The laminated ceramic electronic component according to the present preferred embodiment of the present invention includes a ridge section of the component main body that includes an R chamfered section, the R chamfered section preferably has a radius of curvature of about 0.01 mm or less, for example, and the plating film of the external electrode preferably extends from the end surface across the R chamfered section, and includes end edges located on the principal surfaces and/or the side surfaces.

Preferably, the exposed ends of the internal electrodes at the end surface protrude from the end surface, or are recessed from the end surface with a recess length of about 1 μm or less, for example.

According to another preferred embodiment of the present invention, a method for manufacturing a laminated ceramic electronic component includes a step of preparing a component main body having a substantially rectangular parallelepiped shape, the component main body including a pair of principal surfaces opposed to each other, a pair of side surfaces opposed to each other, and a pair of end surfaces opposed to each other, and a plurality of ceramic layers extending in a direction in which the principal surfaces extend and stacked in a direction of connecting the pair of principal surfaces, and a plurality of internal electrodes arranged along a plurality of interfaces between the ceramic layers, the internal electrodes each including an end exposed at either one of the pair of end surfaces.

Then, a polishing step is carried out for polishing the surface of the component main body. In this polishing step, a ridge section of the component main body including an R chamfered section is formed, wherein a radius of curvature of the R chamfered section is controlled to be about 0.01 mm or less, for example.

Then, a plating step is carried out for directly forming a plating film to serve as at least a portion of an external electrode on the end surfaces, so as to be electrically connected to the plurality of internal electrodes. In this case, plating conditions are selected such that the plating film extends from the end surface across the R chamfered section, and includes end edges located on the principal surfaces and/or the side surfaces.

In the method for manufacturing a laminated ceramic electronic component according to a preferred embodiment of the present invention, as a result of the polishing step, in the component main body, it is preferable that the exposed ends of the internal electrodes at the end surface protrude from the end surface, or are recessed from the end surface with a recess length of about 1 μm or less, for example.

In addition, the polishing step is preferably carried out by using an ion milling method, for example.

According to various preferred embodiments of the present invention, even when an R chamfered section is provided in a ridge section of the component main body, the fixing strength of ends of a plating film to serve as at least a portion of an external electrode to the component main body can be prevented from being decreased. Therefore, the sealing property of the plating film is kept high, and the moisture resistance of the laminated ceramic electronic component can be thus kept high. This is assumed to be because the plating film extends from the end surface across the R chamfered section, and includes end edges located on the principal surfaces and/or the side surfaces, while the R chamfered section provided in the ridge section of the component main body has a radius of curvature of about 0.01 mm or less, thereby increasing the clamping force, in other words, increasing the anchoring effect between the plating film and the component main body in the ridge section.

In various preferred embodiments of the present invention, when the exposed ends of the internal electrodes are arranged to protrude from the end surface, or arranged to be recessed from the end surface with a recess length of about 1 μm or less, the exposed ends of the internal electrodes are able to function adequately as nuclei for plating deposition, thereby improving the coverage of the plating film, and achieving satisfactory and reliable joining between the internal electrodes and the plating film.

When the polishing step is carried out by applying an ion milling method, the radius of curvature will not be excessively increased for the R chamfered section in the ridge section of the component main body while achieving the degree of exposing the internal electrodes as described above, and will be easily reduced to about 0.01 mm or less, for example.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3A shows a cross section along the plane in which a first internal electrode 11 is located, whereas FIG. 3B shows a cross section along the plane in which a second internal electrode 12 is located.

DETAILED DESCRIPTION OF THE PREFERRED EMBODIMENTS

Figure 1:
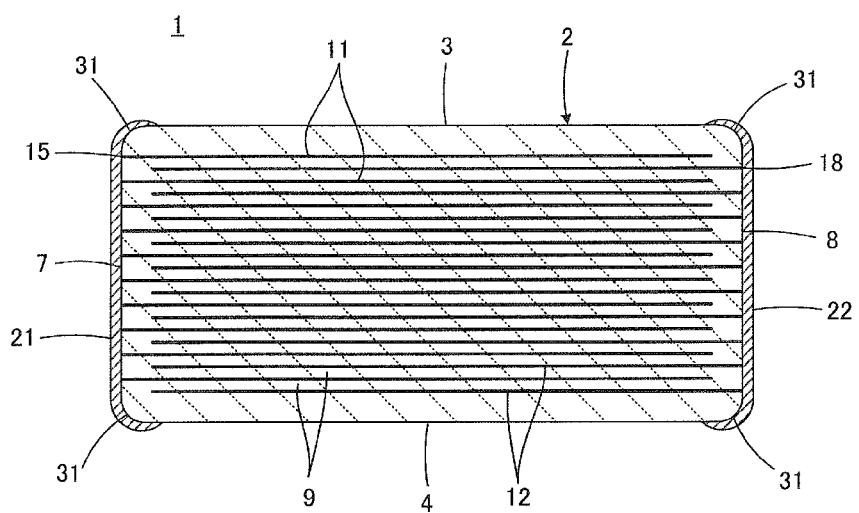
FIG. 1 is a cross-sectional view illustrating a laminated ceramic capacitor 1 as a laminated ceramic electronic component according to a preferred embodiment of the present invention.

As shown in FIG. 1, a laminated ceramic capacitor 1 as a laminated ceramic electronic component according to a preferred embodiment of the present invention includes a component main body 2. The component main body 2 preferably has a substantially rectangular parallelepiped shape including first and second principal surfaces 3 and 4 opposed to each other, first and second side surfaces 5 and 6 opposed to each other, as well as first and second end surfaces 7 and 8 opposed to each other.

The component main body 2 includes, as clearly shown in FIG. 1, a plurality of ceramic layers 9 extending in the direction in which the principal surfaces 3 and 4 extend, and stacked in the direction of connecting the pair of principal surfaces 3 and 4, and each of the plurality of first and second internal electrodes 11 and 12 being arranged along a plurality of interfaces between the ceramic layers 9. The first internal electrodes 11 and the second internal electrodes 12 are arranged alternately in the stacking direction. In addition, the ceramic layers 9 are preferably made of a dielectric ceramic.

Figure 3A:
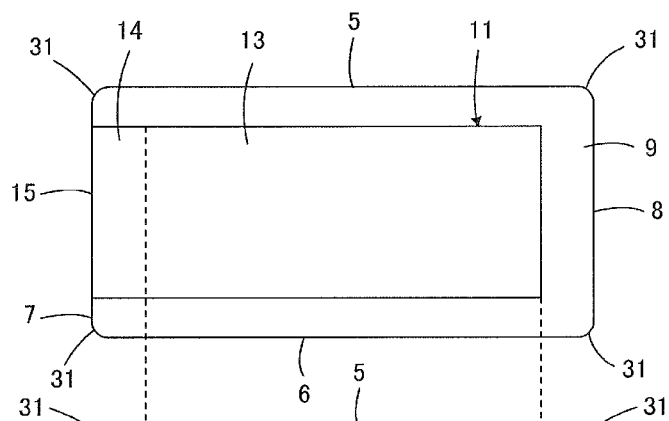
FIGS. 3A and 3B are plan views illustrating the internal structure of the component main body 2 shown in FIG. 2, where
Figure 3B:
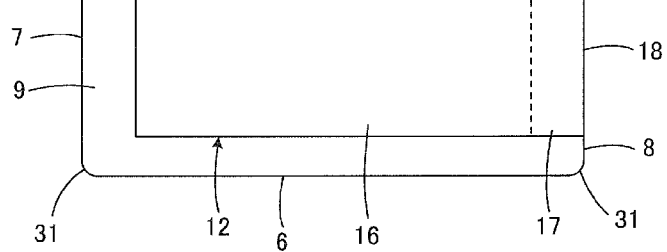

The first internal electrode 11 includes, as clearly shown in FIG. 3A, an opposed section 13 and an extracting section 14 extending in a direction extending from the opposed section 13 toward a first end surface 7, and an exposed end 15 exposed at the first end surface 7 is provided at the end of the extracting section 14. The second internal electrode 12 includes, as clearly shown in FIG. 3B, an opposed section 16 opposed to the opposed section 13 of the first internal electrode 11 with the ceramic layer 9 interposed therebetween, and an extracting section 17 extending in a direction extending from the opposed section 16 toward the second end surface 8, and an exposed end 18 exposed at the second end surface 8 is provided at the end of the extracting section 17.

The internal electrodes 11 and 12 contain, for example, nickel as their constituent.

A first external electrode 21 is arranged on the first end surface 7 of the component main body 2 so as to be electrically connected to the first internal electrodes 11, whereas a second external electrode 22 is arranged on the second end surface 8 so as to be electrically connected to the second internal electrodes 12. These first and second external electrodes 21 and 22 preferably include, in this preferred embodiment, plating films disposed directly on the end surfaces 7 and 8. It is to be noted that the plating films may be formed by either of electrolytic plating and electroless plating. In addition, the plating film may include multiple plating layers, for example, a Cu plating layer, a Ni plating layer thereon, and a Sn plating layer thereon.

A characteristic configuration of a preferred embodiment of the present invention will be demonstrated below by describing a method for manufacturing the laminated ceramic capacitor 1.

Figure 4:
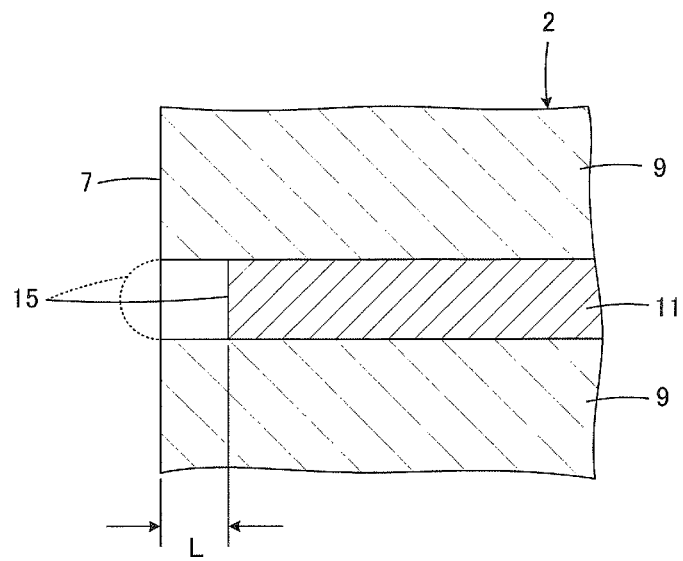
FIG. 4 is a cross-sectional view illustrating an enlarged periphery of an exposed end 15 of the internal electrode 11 in the component main body 2 shown in FIG. 2.

First, after the component main body 2 is obtained which has a structure as described above, the surface of the component main body 2 is subjected to a polishing treatment in order to sufficiently enhance the degree of exposure of the exposed ends 15 and 18 of the internal electrodes 11 and 12. To give an explanation with reference to FIG. 4 illustrating the exposed end 15, this polishing provides the exposed ends 15 and 18 arranged to protrude respectively from the end surfaces 7 and 8 as indicated by a dotted line, or to have a recess length L of about 1 μm or less, for example, even when the exposed ends 15 and 18 are recessed from the end surfaces 7 and 8 as indicated by a solid line. When this degree of exposure is achieved, the exposed ends 15 and 18 are able to function adequately as nuclei for plating deposition.

Figure 5:
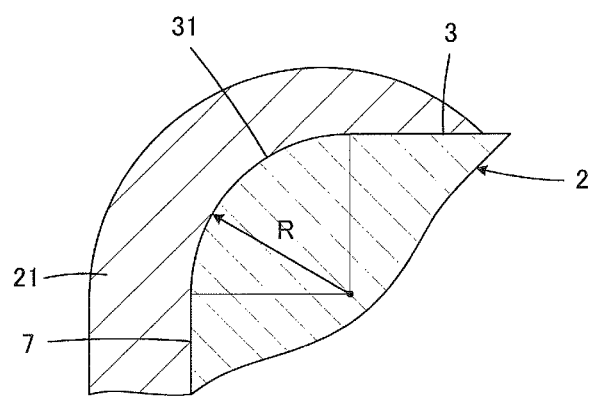
FIG. 5 is a cross-sectional view illustrating an enlarged end edge of an external electrode 21 and periphery thereof in the laminated ceramic capacitor 1 shown in FIG. 1.

The polishing treatment described above forms an R chamfered section 31 in a ridge section of the component main body 2 at the same time. The R chamfered section 31 preferably is controlled so as to have a radius of curvature R of about 0.01 mm or less, for example, as shown in FIG. 5. As the time period for the polishing treatment is longer, the radius of curvature R is increased accordingly. Thus, it is important to complete the polishing treatment in a relatively short period of time in order to reduce the radius of curvature R preferably to about 0.01 mm or less, for example.

In this regard, when a sandblasting method or a barrel polishing method is used to perform the polishing treatment, there is a need for a relatively long period of time for the polishing treatment in order to achieve the adequate degree of exposure as described above. Thus, undesirably, the radius of curvature R is likely to be increased, and it is difficult to achieve a balance between the condition of the appropriate degree of exposure and the condition of the appropriate radius of curvature.

Therefore, for example, an ion milling method preferably is advantageously adopted as a polishing method for easily reducing the radius of curvature R to about 0.01 mm or less, for example, while ensuring the adequate degree of exposure. When an ion milling method is used to perform the polishing treatment, it is easy to achieve a balance between the condition of the appropriate degree of exposure and the condition of the appropriate radius of curvature. It should be noted that the polishing method which can satisfy the desirable conditions described above is not limited to the ion milling method.

Next, a plating step is carried out for forming plating films to serve as the first and second external electrodes 21 and 22 directly on the end surfaces 7 and 8, so as to electrically connect each plurality of the first and second internal electrodes 11 and 12, respectively. While either of electrolytic plating and electroless plating may be applied in the plating step, it is preferable to apply electrolytic plating in view of the fact that a pretreatment with a catalyst or the like is not required.

In the plating step, metal ions in a plating solution are deposited on the respective exposed ends 15 and 18 of the internal electrodes 11 and 12 in the component main body 2, and the plated depositions deposited, that is, plating films first grow on the end surfaces 7 and 8 to form bridges in the stacking direction between the respective adjacent exposed ends 15 and 18 of the internal electrodes 11 and 12. Then, the plating films eventually grow so as to extend from each of the end surfaces 7 and 8 across the R chamfered section 31 and include end edges located on the principal surfaces 3 and 4 as well as the side surfaces 5 and 6.

As described above, in order to make plating growth more likely to be produced in the planar direction, it is preferable to, for example, relatively increase the temperature of the plating bath, or use a barium titanate-based material as a ceramic material to serve as a base.

In addition, the plating films preferably contain, for example, copper as their main constituent. This is because copper exhibits favorable electrical conductivity, and provides favorable throwing power in plate processing, thus allowing for efficient plate processing, and for an increase in the fixing strength of the external electrodes 21 and 22 to the component main body 2.

Next, after carrying out cleaning, a heat treatment is carried out. As the heat treatment temperature, a temperature of, for example, about 600° C. or more, preferably about 800° C. or more is used. This heat treatment increases the fixing strength of the plating films to the component main body 2.

Next, if necessary, an upper plating film including at least one layer is formed on the plating films. When the base plating films contain copper as their main constituent as described above, the upper plating film has, for example, a two-layer structure including a solder barrier layer of a plating layer containing nickel as its main constituent, and a solderability providing layer of a plating layer containing tin or gold as its main constituent, which is formed on the solder barrier layer to provide solderability.

After the formation of the upper plating films described above, cleaning is carried out to complete the laminated ceramic capacitor 1.

It is to be noted that while the laminated ceramic capacitor 1 illustrated preferably is a two-terminal capacitor including the two external electrodes 21 and 22, various preferred embodiments of the present invention can be applied to multi-terminal laminated ceramic capacitors including three or more terminals. In the case of multi-terminal laminated ceramic capacitors including three or more terminals, a design is likely to be adopted in which plating films to serve as external electrodes each extend from an end surface of a component main body across an R chamfered section, and include end edges located on only one of principal surfaces and side surfaces.

Furthermore, various preferred embodiments of the present invention can also be applied to laminated ceramic electronic components other than laminated ceramic capacitors. For example, various preferred embodiments of the present invention can also be applied to laminated ceramic electronic components constituting inductors, thermistors, piezoelectric components, etc. Therefore, depending on the function of the laminated ceramic electronic component, the ceramic layers can be preferably made of, in addition to a dielectric ceramic, a magnetic ceramic, a semiconductor ceramic, a piezoelectric ceramic, etc.

Next, a non-limiting experimental example will be described which was carried out for confirming the advantageous effects of preferred embodiments of the present invention.

In this non-limiting experimental example, laminated ceramic capacitors as samples were prepared in accordance with the following steps.

(1) Preparation of Component Main Body
(2) Polishing of Component Main Body
(3) Formation of Base Plating Film by Electrolytic Copper Plating
(4) Heat Treatment
(5) Formation of Upper First Plating Film by Electrolytic Nickel Plating
(6) Formation of Upper Second Plating Film by Electrolytic Tin Plating Details of the respective steps (1) to (6) are as follows.

(1) Preparation of Component Main Body

Figure 2:
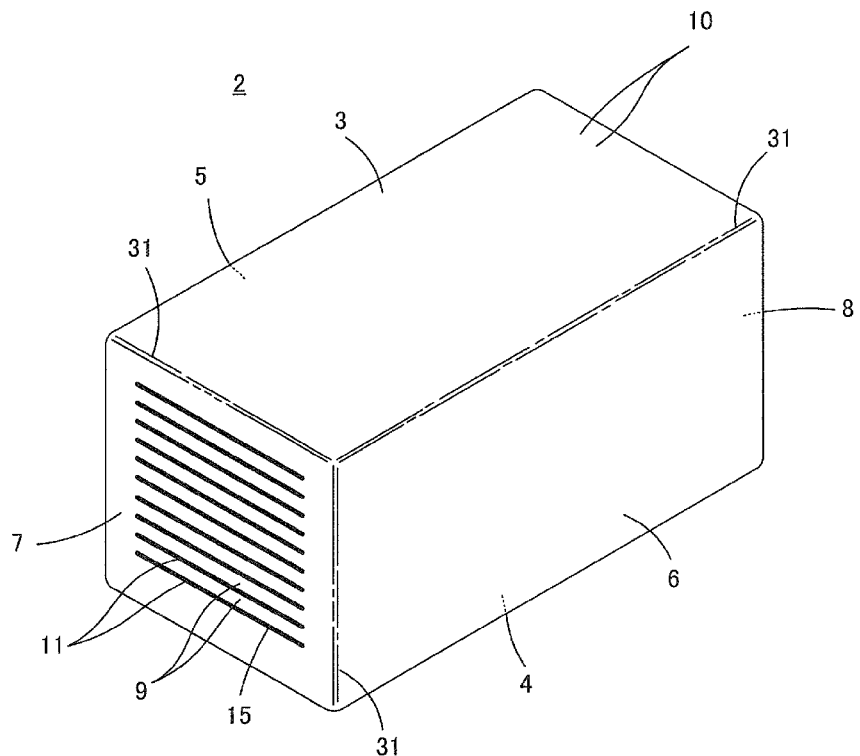
FIG. 2 is a perspective view illustrating a component main body 2 provided in the laminated ceramic capacitor 1 shown in FIG. 1.

A component main body for laminated ceramic capacitors was prepared which had a structure as shown in FIGS. 1 and 2. This component main body had a length of 1.0 mm, a width of 0.5 mm, and a height of 0.5 mm, in which ceramic layers were composed of a barium titanate-based dielectric ceramic, internal electrodes contained nickel as their main constituent, the ceramic layers between adjacent internal electrodes each had a thickness of 1 μm, the internal electrodes each had a thickness of 1 μm, and outer layer sections with no internal electrode formed thereon each had a thickness of 50 μm.

(2) Polishing of Component Main Body

Next, the component main body was subjected, after firing, to a polishing treatment by any of sandblasting, barrel polishing, and ion milling as shown in the column "Polishing Method" of Table 1.

The sandblasting method is carried out such that the component main body was put into a perforated crucible container, and entirely blasted with an abrasive agent composed of SiC while rotating the container, thereby polishing the surface of the component main body to sufficiently expose the exposed ends of the internal electrodes in the component main body, and the sandblasting conditions were adjusted to air pressure: 0.1 MPa and time: 60 minutes.

The barrel polishing was carried out such that the component main body, an abrasive agent, and pure water were put in an airtight container, and the component main body in the container was entirely polished while rotating the container, thereby sufficiently exposing the exposed ends of the internal electrodes in the component main body, and the barrel polishing conditions were adjusted to rotation number: 120 rpm and time: 40 minutes.

The ion milling was carried out under the conditions of accelerating voltage: 6 kV, beam incident angle: 15°, gas species: Ar, and time: 15 minutes, to sufficiently expose the exposed ends of the internal electrodes in the component main body.

The column "Radius of Curvature" of Table 1 shows the radius of curvature for an R chamfered section formed in a ridge section of the component main body after the polishing step. In addition, the column "Recess Length of Internal Electrode" of Table 1 shows the recess length of the exposed end of the internal electrode from the end surface after the polishing step.

(3) Formation of Base Plating Film by Electrolytic Copper Plating

Next, for each sample, the component main bodies for 20 ml were put in a 300 ml horizontal rotation barrel, in addition to which, 70 ml of a medium of 0.4 mm in diameter was put into the barrel, and 50 cc of nylon-coated iron balls of 8.0 mm in diameter were put in the barrel as stirring balls, and electrolytic copper plating was carried out while rotating the barrel at the rotation number of 20 rpm.

In this electrolytic copper plating, first, Cu strike plating was carried out while using the following Cu strike bath.

Cu Strike Bath
Copper Pyrophosphate Trihydrate: 14 g/L (Cu Concentration: 5 g/L)
Potassium Pyrophosphate: 120 g/L
Potassium Oxalate: 10 g/L
pH: 8.7 (Polyphosphoric Acid/Potassium Hydroxide)
Bath Temperature: 25° C.

Then, after carrying out cleaning with pure water, thick Cu plating was carried out using the following thick Cu bath. The thick Cu plating was carried out until a film thickness of 7 μm was obtained in total along with the previous Cu strike plating.

Thick Cu Bath
Pyro-Bright Process from C. Uyemura & Co., Ltd.
pH: 8.6
Bath Temperature: 55° C.

Then, cleaning with pure water was carried out.

(4) Heat Treatment

Next, a heat treatment of keeping at a temperature of 800° C. for 20 minutes was carried out in a nitrogen atmosphere.

(5) Formation of Upper First Plating Film by Electrolytic Nickel Plating

Next, for each sample, the component main bodies for 20 ml were put in a horizontal rotation barrel of 300 ml in drum volume and 70 mm in diameter, in addition to which, 40 ml of a Sn—Ag—Cu medium of 0.45 mm in diameter was put in the barrel, and 50 cc of nylon-coated iron balls of 8.0 mm in diameter were put in the barrel as stirring balls, and electrolytic nickel plating was carried out while rotating the barrel at the rotation number of 20 rpm.

In this electrolytic nickel plating, a nickel plating film with a film thickness of 5 μm was obtained with the use of the following Watts bath.

Watts Bath
Nickel Sulfate: 300 g/L
Nickel Chloride: 45 g/L
Boric Acid: 40 mg/L
pH: 4.0
Bath Temperature: 55° C.

Then, cleaning with pure water was carried out.

(6) Formation of Upper Second Plating Film by Electrolytic Tin Plating

Next, electrolytic tin plating was carried out in the same apparatus and under the same conditions as in the electrolytic nickel plating, except for the use of a neutral tin plating bath as an electrolytic tin plating bath, thereby providing a tin plating film with a film thickness of 3 μm.

In the way described above, an external electrode composed of the copper plating film, the nickel plating film, and the tin plating film was formed on ends including the end surfaces of the component main bodies.

Then, after carrying out cleaning with pure water, drying was carried out at a temperature of 80° C. for 15 minutes in air.

The laminated ceramic capacitors according to each sample, obtained in the way described above, were evaluated for "Sealing Percent Defective" and "Deposition Property", as shown in Table 1.

The "Sealing Percent Defective" refers to the ratio of the number of defective samples in a moisture resistance loading test for the total number of samples of 500, which was obtained such that the laminated ceramic capacitors according to each sample were mounted by soldering onto substrates, and subjected to a moisture resistance loading test of applying a voltage of 6.3 V to the laminated ceramic capacitors for 1000 hours under an environment at a temperature of 125° C. and a relative humidity of 95%, and the samples with an IR (insulation resistance) less than $1\times10^7\Omega$ were then determined as defectives.

The "Deposition Property" was obtained by evaluating the laminated ceramic capacitors according to each sample for whether or not the external electrode was formed properly on the end surface of the component main body. The mark "○" was put if the external electrode was formed properly, whereas the mark "x" was put if not.

TABLE 1

| Sample Number | Polishing Method | Radius of Curvature [mm] | Recess Length of Internal Electrode [μm] | Sealing Percent Defective | Deposition Property |
|---|---|---|---|---|---|
| 1 | Sandblast | 0.03 | 1 | 1.4% | ○ |
| 2 | Barrel Polishing | 0.03 | 1 | 1.4% | ○ |
| 3 | Ion Milling | 0.01 | 0.7 | 0% | ○ |
| 4 | Ion Milling | 0.015 | 0.7 | 0.8% | ○ |
| 5 | Ion Milling | 0.005 | 0.85 | 0% | ○ |
| 6 | Ion Milling | 0.002 | 0.9 | 0% | ○ |

As can be seen from Table 1, samples 1 to 6 provided a "Recess Length of Internal Electrode" of about 1 μm or less, thereby resulting in the "Deposition Property" of "○".

Among samples 1 to 6, samples 3, 5, and 6 with a "Radius of Curvature" of about 0.01 mm or less each provided the "Sealing Percent Defective" of 0%, thereby exhibiting a favorable sealing property. On the other hand, samples 1, 2, and 4 with a "Radius of Curvature" greater than about 0.01 mm each failed to achieve the "Sealing Percent Defective" of 0%.

Thus, it is determined that samples 3, 5, and 6 are excellent. When attention is paid to the "Polishing Method", it can be said that it is preferable to adopt the ion milling method as the "Polishing Method" in order to achieve the "Radius of Curvature" of about 0.01 mm or less while achieving the "Recess Length of Internal Electrode" of about 1 μm or less, as in the case of samples 3, 5, and 6.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated ceramic electronic component comprising:
a component main body having a substantially rectangular parallelepiped shape, the component main body including a pair of principal surfaces opposed to each other, a pair of side surfaces opposed to each other, and a pair of end surfaces opposed to each other, a plurality of ceramic layers extending in a direction in which the principal surfaces extend and stacked in a direction of connecting the pair of principal surfaces, and a plurality of internal electrodes arranged along a plurality of interfaces between the ceramic layers, the internal electrodes each including an end exposed at either one of the pair of end surfaces; and
an external electrode including a plating film disposed directly on the end surfaces so as to be electrically connected to the plurality of internal electrodes; wherein
a ridge section of the component main body includes an R chamfered section including a radius of curvature of about 0.01 mm or less; and
the plating film of the external electrode extends from the end surface across the R chamfered section, and includes end edges located on at least one of the principal surfaces and the side surfaces.

2. The laminated ceramic electronic component according to claim 1, wherein the exposed ends of the internal electrodes at the end surface protrude from the end surface or are recessed from the end surface with a recess length of about 1 μm or less.

3. A method for manufacturing a laminated ceramic electronic component, the method comprising:
a step of preparing a component main body having a substantially rectangular parallelepiped shape, the component main body including a pair of principal surfaces opposed to each other, a pair of side surfaces opposed to each other, and a pair of end surfaces opposed to each other, a plurality of ceramic layers extending in a direction in which the principal surfaces extend and stacked in a direction of connecting the pair of principal surfaces, and a plurality of internal electrodes arranged along a plurality of interfaces between the ceramic layers, the internal electrodes each including an end exposed at either one of the pair of end surfaces;
a polishing step of polishing a surface of the component main body to form an R chamfered section with a radius of curvature of about 0.01 mm or less in a ridge section of the component main body; and
a plating step of directly forming a plating film to define at least a portion of an external electrode on the end surfaces, so as to be electrically connected to the plurality of internal electrodes, and so as to extend from the end surface across the R chamfered section, and include end edges located on at least one of the principal surfaces and the side surfaces.

4. The method for manufacturing a laminated ceramic electronic component according to claim 3, wherein the polishing step is performed such that the exposed ends of the internal electrodes at the end surface protrude from the end surface or are recessed from the end surface with a recess length of about 1 μm or less.

5. The method for manufacturing a laminated ceramic electronic component according to claim 4, wherein the polishing step is carried out by using an ion milling method.

6. The method for manufacturing a laminated ceramic electronic component according to claim 3, wherein the polishing step is carried out by using an ion milling method.

* * * * *